United States Patent
Missotten

(10) Patent No.: US 10,314,237 B2
(45) Date of Patent: Jun. 11, 2019

(54) COMBINE HARVESTER CLEANING SYSTEM

(71) Applicant: CNH Industrial America LLC, New Holland, PA (US)

(72) Inventor: Bart M. A. Missotten, Herent (BE)

(73) Assignee: CNH Industrial America LLC, New Holland, PA (US)

( * ) Notice: Subject to any disclaimer, the term of this patent is extended or adjusted under 35 U.S.C. 154(b) by 392 days.

(21) Appl. No.: 15/309,657

(22) PCT Filed: May 5, 2015

(86) PCT No.: PCT/EP2015/059814
§ 371 (c)(1),
(2) Date: Nov. 8, 2016

(87) PCT Pub. No.: WO2015/173067
PCT Pub. Date: Nov. 19, 2015

(65) Prior Publication Data
US 2017/0142904 A1 May 25, 2017

(30) Foreign Application Priority Data

May 16, 2014 (BE) .................... 2014/0368

(51) Int. Cl.
*A01F 12/44* (2006.01)
*A01D 41/127* (2006.01)

(52) U.S. Cl.
CPC ........ *A01F 12/448* (2013.01); *A01D 41/1276* (2013.01); *A01F 12/44* (2013.01); *A01F 12/444* (2013.01); *A01F 12/446* (2013.01)

(58) Field of Classification Search
CPC ...... A01F 12/44; A01F 12/446; A01F 12/448; A01D 41/1276
See application file for complete search history.

(56) References Cited

U.S. PATENT DOCUMENTS

| 588,468 | A | 8/1897 | Peace |
| 6,761,630 | B1 | 7/2004 | Schwinn et al. |
| 9,149,002 | B2 | 10/2015 | Bischoff |
| 2008/0004092 | A1 | 1/2008 | Nelson et al. |

FOREIGN PATENT DOCUMENTS

| DE | 36044 | 2/1965 |
| DE | 1238707 | 4/1967 |
| DE | 3032861 A1 | 5/1982 |
| DE | 102011007511 A1 | 10/2012 |
| GB | 1374887 | 11/1974 |

*Primary Examiner* — Alicia Torres
(74) *Attorney, Agent, or Firm* — Peter K. Zacharias; Patrick M. Sheldrake

(57) ABSTRACT

A cleaning system for a combine harvester. The cleaning system includes a sieve assembly, a sieve drive, and a louver drive. The sieve assembly includes at least one sieve for receiving a flow of harvested and threshed crop. The sieve includes a plurality of spaced apart louvers forming apertures for separating grain from the flow of the harvested crop, the louvers extending in a direction substantially perpendicular to the flow of the harvested crop. The sieve drive is arranged to apply a reciprocating back and forth sieve movement, at a first frequency f1, to the sieve for propagating the flow of crop from a front end of the sieve to a back end of the sieve. The louver drive is configured to apply a reciprocating louver movement to the louvers at a second frequency f2, whereby f2≥f1.

15 Claims, 5 Drawing Sheets

COMBINE HARVESTER CLEANING SYSTEM

CROSS REFERENCE TO RELATED APPLICATION

This application is the National Stage of International Application No. PCT/EP2015/059814 filed May 5, 2015, which claims priority to Belgian Application No. 2014/0368 filed May 16, 2014, the contents of which are incorporated herein by reference.

FIELD OF THE INVENTION

The invention relates to the field of combine harvesters, and more specifically to a cleaning system as applied in a combine harvester to separate grain or the like and MOG (material other than grain).

BACKGROUND OF THE INVENTION

The present invention relates to a cleaning system as can be applied in a combine harvester. A combine harvester is an agricultural tool to harvest grain crops. In general, the crop is harvested by a reaping operation, followed by a threshing operation, and a subsequent separation operation in which the straw is separated from a grain and MOG (material other than grain) mixture. In order to separate the grain from the MOG, a combine harvester is equipped with a so-called cleaning system (also known as a cleaning shoe) which may typically include one or more sieves. During a transport of the harvested crop along the sieve, a separation of grain and MOG may take place by means of apertures provided in the sieve. Typically, a sieve as applied in a cleaning system comprises a plurality of spaced apart louvers, a spacing between the louvers providing the apertures.

In order to increase the cleaning capacity of the cleaning system, air blowing systems have been added to provide in an upward air flow through the apertures of the sieve.

The present invention aims to provide a further improvement of the operation of a cleaning system in that it increases cleaning capacity.

SUMMARY OF THE INVENTION

It would be desirable to provide an improved cleaning system as can be applied in a combine harvester. To address this, there is provided, in an embodiment of the invention, a cleaning system for a combine harvester, the cleaning system comprising:

a sieve assembly configured to receive a flow of harvested and threshed crop;

the sieve assembly comprising at least one sieve, the sieve comprising a plurality of spaced apart louvers forming apertures for separating grain from the flow of harvested crop, the louvers extending in a direction substantially perpendicular to the flow of harvested crop, a sieve drive arranged to apply a reciprocating back and forth sieve movement, at a first frequency f1, to the sieve for propagating the flow of crop from a front end of the sieve to a back end of the sieve, and a louver drive configured to apply a reciprocating louver movement to the louvers at a second frequency f2, whereby $f2 \geq f1$.

The reciprocating louver movement may be configured to vary a size of the apertures between the louvers in synchronism with the reciprocating back and forth sieve movement, i.e. $f2=f1$ or f2 is an integer multiple of f1. Alternatively, the reciprocating movement is a vibration at a frequency substantially higher than the first frequency f1.

The cleaning system according to the present invention comprises a sieve assembly which comprises at least one sieve. The sieve as applied in the cleaning system according to the present invention comprises a plurality of spaced apart louvers. During operation, the spacings or apertures between the louvers enable a separation of a component from the flow of harvested crop.

The cleaning system further comprises a sieve drive for applying a reciprocating back and forth sieve movement to propagate the flow of crop from a front end of the sieve to a back end of the sieve. Typically, such a sieve movement can be described as a circular or elliptical movement comprising a first portion whereby the sieve is moved forwards, i.e. towards the front end of the sieve (typically combined with a downward movement) and a second portion whereby the sieve is moved backwards (typically combined with an upward movement). Such a movement enables a flow of harvested crop which is supplied to a front end of the sieve, to be moved or propagated from the front end of the sieve to the back end.

During such movement of the sieve, the flow of harvested crop (e.g. including components such as grain and MOG (material other than grain, e.g. chaff)) propagates over the sieve, and, due to a difference in weight or size of the different components, a separation of the components (e.g. the separation of grain) can be realized.

In accordance with the present invention, the cleaning system further comprises a louver drive for applying a movement to the louvers.

In an embodiment of the present invention, the louver movement may be synchronized (i.e. at the same frequency) with the reciprocating sieve movement. In such embodiment, the louver movement may comprise a first portion during which an aperture size between the louvers is smaller than a nominal aperture size and a second portion during which the aperture size between the louvers is larger than a nominal aperture size. In such embodiment, the first portion of the louver movement may e.g. coincide or overlap with the first portion of the sieve movement (when the sieve is moved forwards and downwards), and the second portion of the louver movement may e.g. coincide or overlap with the second portion of the sieve movement (when the sieve is moved upwards and backwards). By doing so, as has been devised by the inventor, a grabbing-like motion or movement is realized during the backward movement of the sieve, enabling more grain to be captured in between the louvers. During the forward portion of the movement, when the louvers are brought more closely together (i.e. the aperture size between the louvers being smaller than a nominal aperture size), the top surface of the sieve becomes more smooth, which may result in a faster propagation of the MOG towards the back end of the sieve.

In another embodiment of the present invention, the louver movement has a higher frequency than the frequency of the sieve movement providing a vibrational movement to the louvers. In an embodiment, the louver movement may e.g. be vibrating movement or a pivoting movement. By doing so, grains that are present above the sieve may be re-oriented when contacting the vibrating louvers, thereby enabling the grains to fall more rapidly through the apertures between the louvers. In an embodiment, the frequency of the louver movement is approx. at least twice the frequency of the sieve movement.

In an embodiment, the cleaning system may further comprise a fan for providing an air flow through the sieve. In an embodiment, the air flow as provided by the fan is modulated such that the air flow through the louvers is in synchronism with the frequency of the louver movement.

In an embodiment, the cleaning system is provided with a sensor configured to provide a signal representative of the separation yield of the sieve assembly. Such as sensor can e.g. comprise a camera. By means of processing of an image of the camera (e.g. determining a size of the particles/components shown on the image), an indication of the separation yield of the sieve assembly may be determined. As an alternative, or in addition, the sensor may comprise one or more piezo-based sensors which provide a signal when hit by a particle or component of the flow of harvested crop.

In an embodiment, the sensor comprises an array of sensors arranged along the sieve.

In an embodiment, the louver drive comprises a controller configured to control a parameter of the louver movement. Possible parameters to be controlled are the amplitude or frequency of the louver movement. In an embodiment, the controller is provided with an input terminal for receiving a yield signal of a sensor, the controller being configured to control the parameter of the louver movement based on the yield signal.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
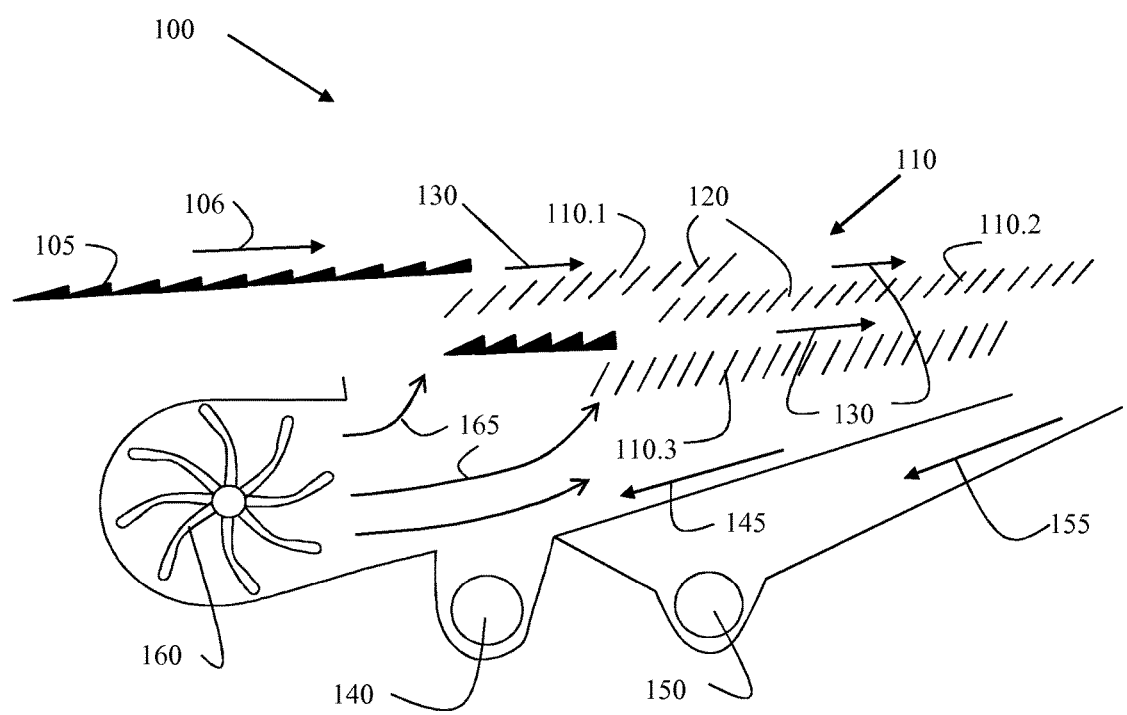
FIG. 1 depicts a cleaning system according to an embodiment of the present invention.

FIG. 1 depicts an embodiment of a cleaning system 100 according to the present invention. The cleaning system may e.g. be used in a combine harvester according to the present invention. The cleaning system further comprises a sieve assembly 110 comprising three sieves 110.1, 110.2 and 110.3. The sieves 110.1, 110.2 and 110.3 of the sieve assembly comprise a plurality of louvers 120 which are spaced apart so as to form spacings or apertures between them through which a component of the harvested crop can fall, thereby separating the component from the remaining part of the harvested crop. The separation of the components takes place during a transport (indicated by the arrows 130) of the harvested crop along a top surface of the sieves. In the embodiment as shown, the separated component which has fallen through the sieve is transported towards an auger 140 (as indicated by the arrow 145) which can e.g. transport the component towards a grain tank. The remainder of the harvested crop (MOG, chaff), not falling through the lower sieve (110.3), is transported towards a second auger 150 (as indicated by the arrow 155).

The embodiment as shown in FIG. 1 further comprises a fan 160 configured to provide an air flow upward through the sieves of the sieve assembly 110. Arrows 165 schematically indicate the air flow through the sieves as can be generated by the fan. An upward air flow through the sieve or sieves of the sieve assembly promotes the separation of the different components of the flow of harvested crop. Depending on the component to be separated, an optimal velocity of the flow of air through the sieve can be determined.

FIG. 1 further shows a transporter 105 configured to receive a flow of harvested crop and transport the harvested crop (indicated by the arrow 106) towards the cleaning system, in particular the sieve assembly 110. Such a transporter may e.g. be a conveyer or auger type transport system or a plate-like structure undergoing a linear, curved, circular or elliptical movement to transport a received flow of harvested crop.

The cleaning system 100 further comprises a sieve drive (not shown) arranged to apply a reciprocating sieve movement, at a first frequency f1, to the sieves 110.1, 110.2 and 110.3, for propagating the flow of crop from a front end of the sieve to a back end of the sieve (i.e. along the top surface as indicated). The reciprocating sieve movement may e.g. be obtained by driving the sieves by means of an eccentric drive mechanism. In such arrangement, the sieve movement can be described as a linear, curved, circular or elliptical movement comprising a first portion whereby the sieve is moved forwards and downwards and a second portion whereby the sieve is moved backwards and upwards. Such a movement enables a flow of harvested crop which is supplied to a front end of the sieve, to be moved or propagated from the front end of the sieve to the back end. In accordance with the present invention, the reciprocating as applied by the sieve drive occurs at a first frequency f1. In an embodiment, the transporter 105 may be driven by the sieve drive as well, in a similar manner as the one or more sieves of the sieve assembly.

In accordance with the present invention, the feature 'front end of the sieve' refers to the part of the sieve where the flow of harvested crop is received, the 'back end of the sieve' refers to the part of the sieve is where the remainder of the flow of harvested crop leaves the sieve.

Typically, when the cleaning system is mounted on a combine harvester, the front end of the sieve points towards the front end of the harvester. In such arrangement, a movement is considered a forward movement when the movement is towards the front end of the harvester. A backward movement is thus a movement towards the back of the harvester and towards the back end of the sieve.

The cleaning system according to the present invention further comprises a louver drive (not shown) to apply a louver movement to the louvers at a second frequency f2, whereby f2 may either be equal to f1 or larger than f1.

As such, in the present invention, two movements (a reciprocating sieve movement and a louver movement) are superimposed. In an embodiment, the plurality of louvers of a sieve may e.g. be mounted to a frame of the sieve, whereby the sieve drive acts on the frame of the sieve (in order to apply the reciprocating sieve movement to the frame and the louvers mounted thereto) and the louver drive acts on the plurality of louvers to provide in the louver movement.

It has been devised by the inventors that the separation yield of a sieve may be increased by applying a combination of a sieve movement and a louver movement. Within the meaning of the present invention, separation yield is used to denote the effectiveness of a sieve. It may e.g. be expressed as a percentage of material of a particular component that is separated during the operation of the sieve.

The inventors have devised that there are different types of louver movement which may have a beneficial effect on the separation yield of a sieve.

Figure 2:
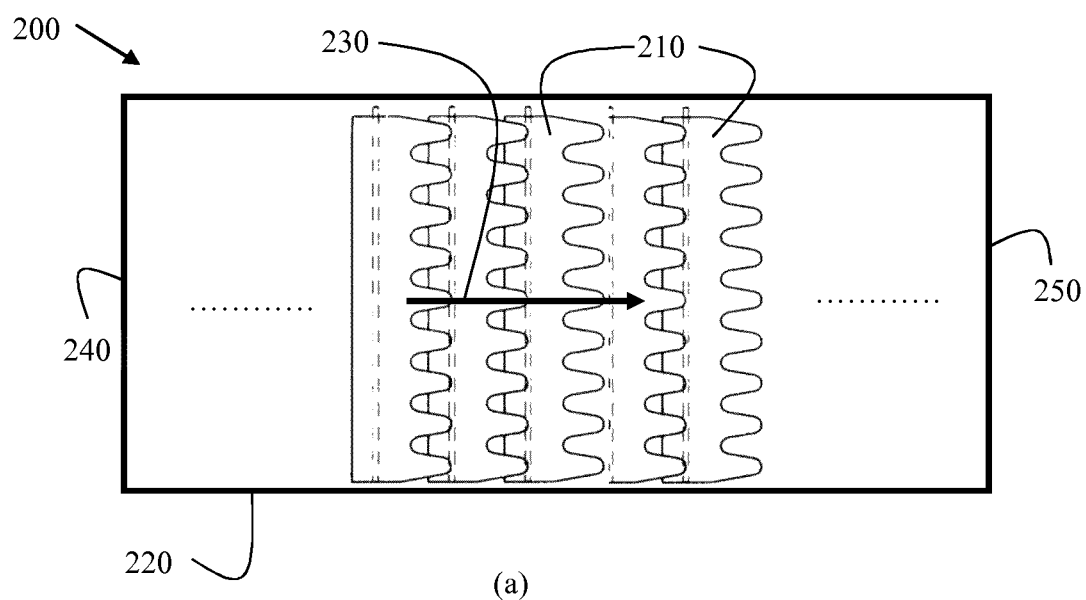
FIG. 2 depicts a sieve as can be applied in a cleaning system according to the present invention.
Figure 2:
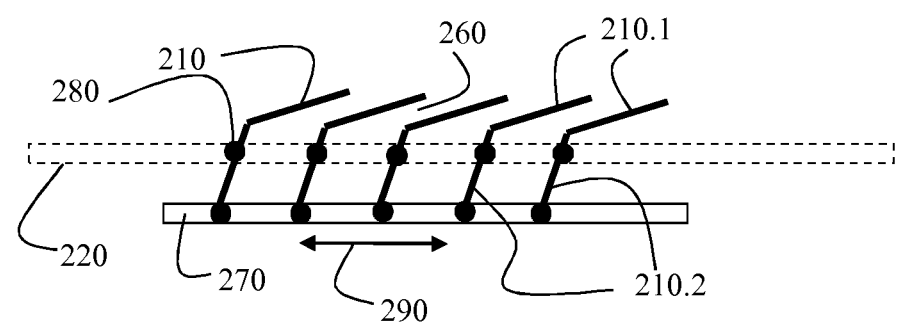

FIG. 2 schematically shows a more detailed view of a sieve as may be applied in an embodiment of a cleaning system according to the present invention. FIG. 2 (a) schematically shows a top view of a sieve 200 comprising a plurality of louvers 210 mounted to a frame 220 of the sieve 200. Arrow 230 indicates the direction of the flow of harvested crop along the sieve from a front end 240 of the sieve towards a back end 250 of the sieve. The louvers 210 are positioned adjacent each other and extend in a direction substantially perpendicular to the flow direction 230. As can be seen from the side view of FIG. 2 (b), the louvers 210 are spaced apart having a gap 260 between adjacent louvers. In the embodiment as shown, the louvers have a top portion 210.1 pointing towards the back end 250 of the sieve. In such arrangement, the louvers 210 may e.g. be pivotally mounted to the frame 220, enabling the louvers to pivot about an axis 280.

Typically, the gap or opening 260 between adjacent louvers may be adjusted so as to obtain a proper operation as a sieve for different types of crop. In FIG. 2 (b) a rail 270 is schematically shown, the rail being connected to the bottom portions 210.2 of the louvers 210. A linear drive or spindle type of drive (not shown) may e.g. be connected to the rail for displacing the rail 270 along the horizontal direction 290, thereby adjusting the gap 260 between the louvers 210.

In accordance with the present invention, rather than merely setting or selecting a particular gap 260 between adjacent louvers, a louver movement is superimposed on the sieve movement during operating of the cleaning system.

In a first embodiment, the louver movement is vibrational movement at a frequency f2 which is larger than f1. Preferably, the frequency f2 is larger than twice the frequency f1.

Figure 3:
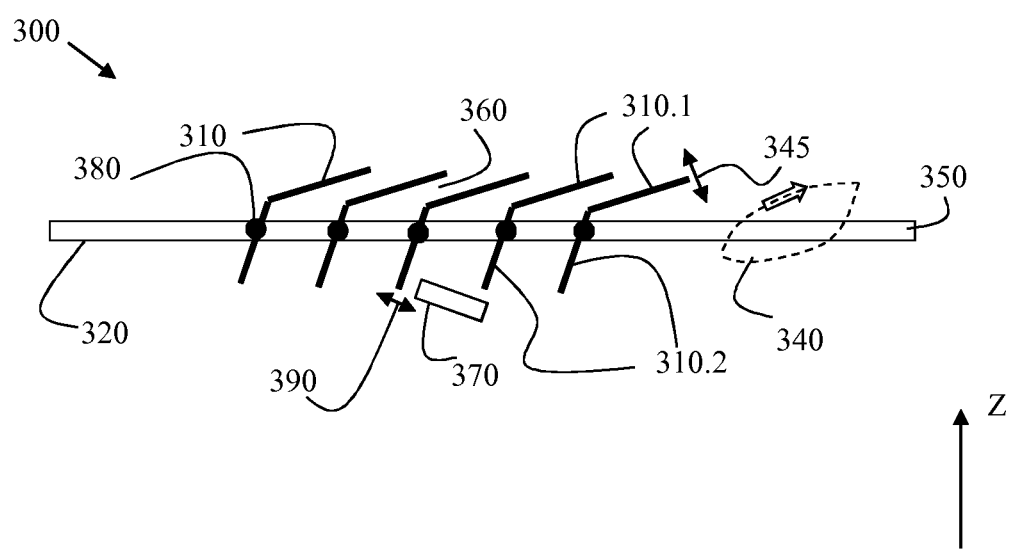
FIG. 3 depicts a detailed side view of a sieve as can be applied in a cleaning system according to the present invention.

FIG. 3 schematically shows an arrangement of a plurality of louvers 310 of a sieve 300, the louvers 310 being mounted to a frame 320 in a displaceable manner at connections 380, the louvers 310 being spaced apart so as to have a gap 360 between them. Indicated by the dotted shape 340 is the sieve movement which may e.g. be applied to the sieve by a sieve drive, such as an eccentric sieve drive. Such a sieve movement may e.g. be linear, circular, elliptical or curved. In accordance with the present invention, a louver movement is applied to displace the louvers relative to the sieve, during the reciprocating sieve movement. As an example, FIG. 3 further indicates a vibrational movement of the louvers of the sieve by arrow 345. Preferably, the louver movement as applied at the frequency f2 has a component in the vertical direction, i.e. the Z-direction as indicated. This may be realized by either displacing the louvers 310 (relative to the frame 320 or the like) in a substantial vertical direction or by applying a pivotal movement to the louvers 310, e.g. about an axis parallel to the longitudinal direction of the louvers As an example of the latter case, connection 380 may e.g. be a pivotable connection.

Typically, the louvers of the sieve have a slanted nominal position, whereby a top portion 310.1 of the louvers 310 points towards the back end 350 of the sieve. By applying a pivoting movement to the louvers, the top portion 310.1 of the louvers contacting the flow of harvested crop as it propagates over the sieve, exert an upward force on the flow of crop. It is believed that such excitation of the flow of harvested crop can provide in a re-orientation of the component (e.g. grain or the like) of the harvested crop that needs to separated. Such a re-orientation may subsequently facilitate the transport of the component through the apertures of the sieve.

In order to displace the louvers 310 in the manner described, various options exist.

As a first example, the bottom portions 310.2 of the louvers may be connected to a common rail (e.g. in a manner as shown in FIG. 2 by a rail 270), whereby an actuator such as a linear actuator is applied to displace the rail in substantially horizontal position, thereby rotating or pivoting the louvers about the connections 380 and thus providing in the louver movement indicate by the arrow 345.

As a second example, an electromagnetic relay may be applied to displace the louvers. Such a relay or relays 370 may e.g. be configured near the bottom portions 310.2 of the louvers to displace the bottom portions 310.2 in a direction as indicated by the arrow 390.

In such arrangement, each individual louver may be equipped with a relay or, several louvers may be connected to a common rail, the rail being actuated by the relay or relays.

In a second embodiment, the louver movement is pivotal movement along a longitudinal axis of the louvers, at a frequency f2 substantially equal to f1, i.e. the louver movement is a movement that is synchronized with the sieve movement. In such embodiment, the louver movement may e.g. comprise a first portion during which an aperture size between the louvers is larger than a nominal aperture size and a second portion during which the aperture size between the louvers is smaller than a nominal aperture size. In such arrangement, the louver movement may advantageously be synchronized with a reciprocating sieve movement, the reciprocating sieve movement comprising a first portion whereby the sieve is displaced towards the front end (of the sieve) and downwards, and a second portion whereby the sieve is displaced towards the back end (of the sieve) and upwards. In such arrangement, the first portion of the louver movement may overlap or coincide with the first portion of the reciprocating sieve movement and the second portion of the louver movement overlaps or coincides with the second portion of the reciprocating sieve movement.

Figure 4:
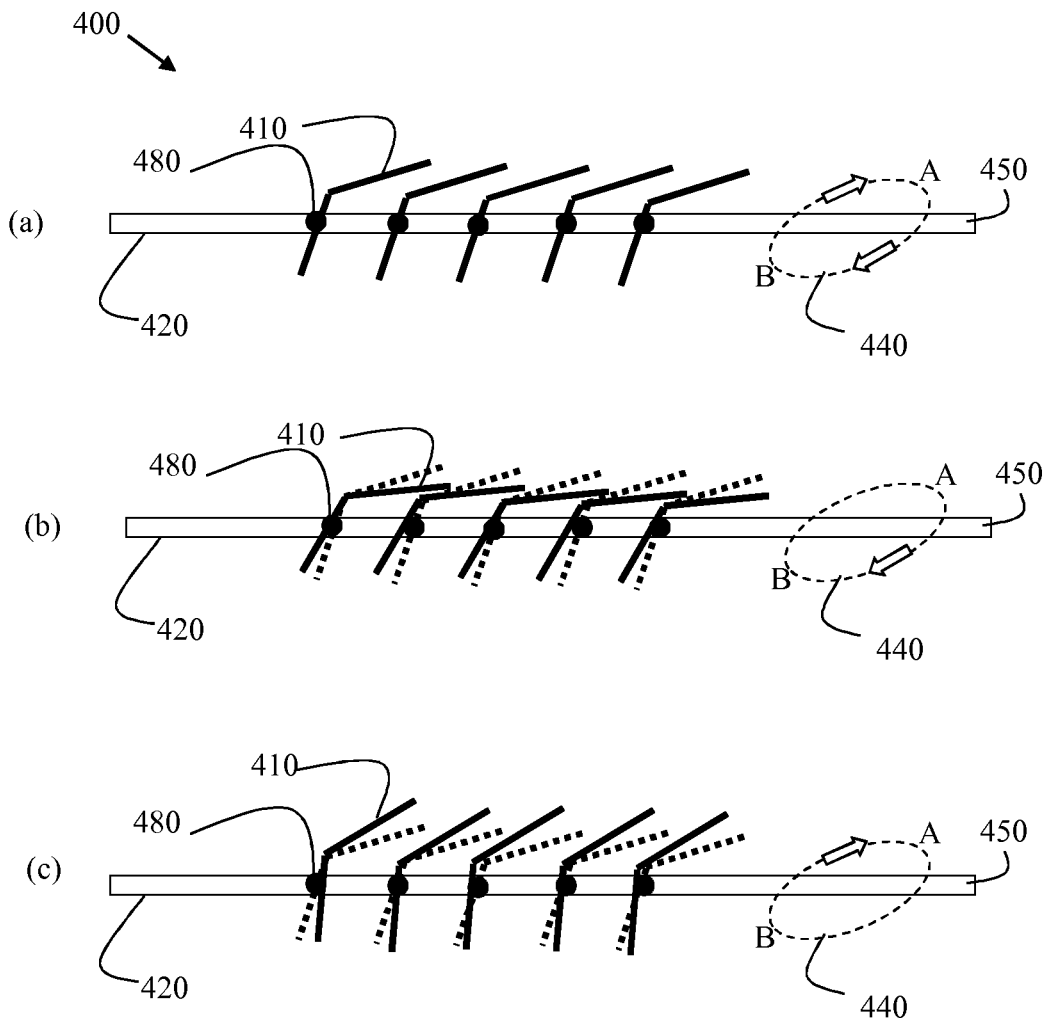
FIG. 4 depicts a louver movement as can be applied to a sieve of a cleaning system according to the present invention.

This is schematically illustrated in FIG. 4.

FIG. 4 (a) schematically shows a side view of a sieve comprising a plurality of louvers 410 which are mounted to a frame 420 in a displaceable manner, e.g. displaceable about connections 480. Indicated by ellipse 440 is the reciprocating sieve movement as applied to the sieve during operation. The first portion of the sieve movement can be considered to comprise a displacement of the sieve from A to B on the ellipse (in clockwise direction), such displacement being a forward and downward movement. The second portion of the sieve movement may then be considered to comprise a displacement of the sieve from B to A on the ellipse (in clockwise direction), such displacement being a backward (towards the back end 450 of the sieve) and downward movement. FIGS. 4 (b) and 4 (c) schematically show the corresponding louver movement during the first and second portion of the reciprocating sieve movement. As can be seen, during the first portion of the sieve movement (FIG. 4 (b)), the louver movement is such that an aperture size between adjacent louvers is smaller than a nominal aperture size (the nominal position of the louvers e.g. being as indicated in FIG. 4 (a), and indicated in dotted line in FIGS. 4 (b) and 4 (c)), whereas, during the first portion of the sieve movement (FIG. 4 (c)) the louver movement is such that an aperture size between adjacent louvers is larger than the nominal aperture size.

Figure 5:
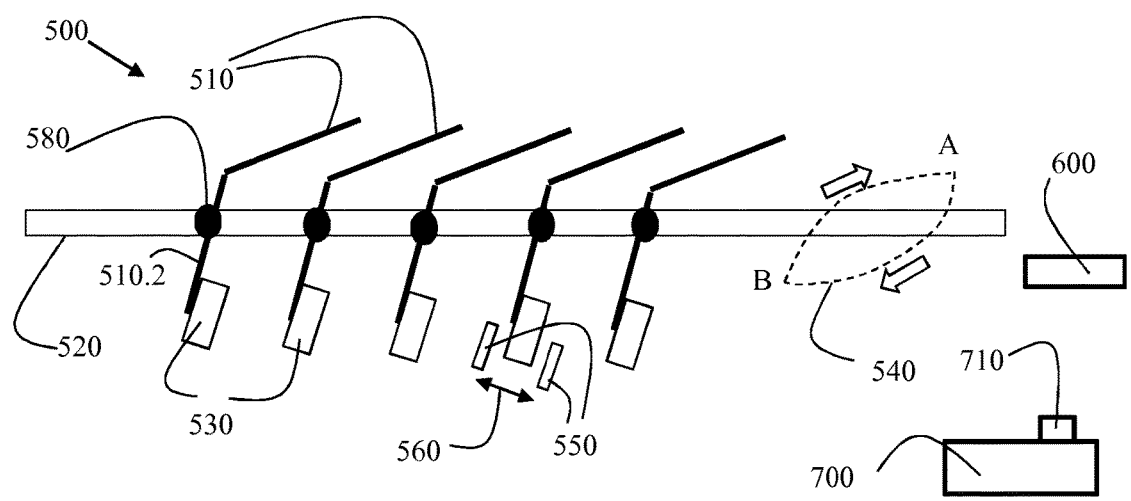
FIG. 5 depicts a louver arrangement including counterweights for providing a louver movement.

In the event that the cleaning system includes a fan for providing an upward air flow through the apertures of the sieve (see e.g. fan 160 of FIG. 1), it may be advantageous to adjust the flow as provided by the fan in synchronism with the louver movement. As mentioned above, an optimal velocity of the air flow through the sieve may be determined for the separation of a particular component of the harvested crop. By changing the spacings between the louvers of a sieve, the air flow resistance of the sieve changes. As such, the louver movement as e.g. illustrated in FIGS. 4 (b) and 4 (c) would result in a changed flow velocity through the sieve in case the fan rate (e.g. expressed in liters/second) is not adjusted. In order to mitigate or remove this change in velocity, the ventilation rate of the fan may be adjusted in synchronism with the louver movement. By doing so, the velocity of the air flow through the apertures between the louvers can be kept substantially constant. In order to realize the louver movement as illustrated in FIG. 4, similar drive arrangement as discussed above may be applied as well. As an alternative, the louver movement may also be realized by providing counterweights to the louvers. An example of such arrangement is schematically shown in FIG. 5. FIG. 5 shows a plurality of louvers 510 mounted to a frame 520 of a sieve 500, the louvers 510 being pivotable about connections 580.

In order to generate a louver movement as e.g. illustrated in FIGS. 4 (b) and 4 (c), i.e. a louver movement that is synchronized with the sieve movement 540, counterweights 530 may be mounted to lower portions 510.2 of the louvers 510. When a reciprocating sieve movement 540 is applied to the sieve 500, the louvers will perform a louver movement as illustrated in FIG. 4, due the counterweights mounted below the pivotable connections 580. Rather than applying a counterweight to each louver separately, two or more louvers 510 may be connected (e.g. by a rail 270 as shown in FIG. 2) and provided with a common counterweight.

FIG. 5 further illustrates (for only one of the louvers 510) the use of end-stops 550 to limit the displacement of the louvers. The end-stops may e.g. be mounted to the frame 520 of the sieve and may be configured to restrict the displacement 560 of the counterweight 530, thereby limiting the displacement of the louvers 510.

In an embodiment, the positions of the end-stops are adjustable. By doing so, the allowable displacement of the louvers, and thus the smallest and largest possible spacing between the louvers can be set, e.g. depending on the type of crop and its bulk properties like kernel size, humidity, etc. . . . that is harvested.

In an embodiment, the cleaning system according to the present invention is provided with one or more sensors configured to provide a signal representative of the separation yield of material falling through the sieve assembly. As an example, such a sensor 600 may e.g. be mounted at the back end of a sieve and provide feedback on the amount of a particular component (e.g. the component of the harvested crop that is to be separated) that is outputted at the end of the sieve. Determining this amount may be a measure of the effectiveness of the sieve in separating the particular component. Such as sensor can e.g. comprise a camera, e.g. including a 2D CCD camera. By processing an image of the camera (e.g. determining a size of the particles/components shown on the image), an indication of the separation yield of the sieve assembly may be determined. As an alternative, or in addition, the sensor may comprise one or more piezo-based piezoelectric sensors which provide a signal when hit by a particle or component of the flow of harvested crop.

In an embodiment, the sensor comprises an array of sensors arranged along the sieve, e.g. a first sensor at the front end of the sieve, a second sensor at the end of the sieve and a third sensor near the middle of the sieve. Based on information retrieved from the array of sensors, the effectiveness of the separation along the sieve can be determined.

In an embodiment, the cleaning system according to the invention comprises a controller 700 configured to control an operative parameter of the cleaning system. The controller may e.g. be configured to control the sieve drive, the louver drive or both. In particular, the controller may e.g. control the frequencies f1 and/or f2 of the reciprocating sieve movement and the louver movement. Possible parameters to be controlled are the amplitude or frequency of the louver movement. The amplitude of the louver movement may e.g. be controlled by controlling the position of the end-stops as shown in the embodiment of FIG. 5.

In an embodiment, the controller 700 is provided with an input terminal 710 for receiving a signal of one or more of the aforementioned sensors e.g. sensor 600, the controller being configured to control the parameter of the louver movement based on the signal.

In an embodiment, the controller may also be configured to control an operation of a fan of the cleaning system in order to obtain an optimal air flow through the sieve or sieves, in dependency of the louver movement. In order to facilitate such control, the cleaning system may be equipped with one or more pressure sensors or velocity sensors for determining the velocity of the air flow through the spacings separating the louvers.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A cleaning system for a combine harvester, the cleaning system comprising:
a sieve assembly configured to receive a flow of harvested and threshed crop, the sieve assembly comprising at least one sieve comprising a plurality of spaced apart louvers forming apertures for separating grain from the flow of the harvested and threshed crop, the louvers extending in a direction substantially perpendicular to the flow of harvested and threshed crop;

a sieve drive arranged to apply a reciprocating back and forth sieve movement, at a first frequency f1, to the at least one sieve for propagating the flow of the harvested and threshed crop from a front end of the at least one sieve to a back end of the at least one sieve; and a louver drive configured to apply a reciprocating louver movement to the louvers of the at least one sieve at a second frequency f2, whereby f2≥f1.

2. The cleaning system according to claim 1, wherein the louver drive is configured to apply the reciprocating louver movement such as to vary a size of the apertures formed by the louvers in synchronism with the reciprocating back and forth sieve movement.

3. The cleaning system according to claim 1, wherein the reciprocating louver movement comprises a pivoting movement about a longitudinal axis of the louvers.

4. The cleaning system according to claim 2, wherein the reciprocating louver movement comprises a first portion during which a size of the apertures formed by the louvers is smaller than a nominal aperture size and a second portion during which a spacing between the louvers is larger than the nominal aperture size.

5. The cleaning system according to claim 1, wherein the second frequency f2 is at least twice the first frequency f1.

6. The cleaning system according to claim 5, wherein the first frequency f1 is in a range of 3 to 6 Hz, and the second frequency f2 is in a range of 8 to 12 Hz.

7. The cleaning system according to claim 4, wherein the first portion of the reciprocating louver movement overlaps or coincides with a first portion of the reciprocating back and forth sieve movement during which the at least one sieve is displaced towards the front end of the at least one sieve, and the second portion of the louver movement overlaps or coincides with a second portion of the reciprocating back and forth sieve movement during which the at least one sieve is displaced towards the back end of the at least one sieve.

8. The cleaning system according to claim 1, further comprising a fan configured to provide an air flow in an upward direction through the spaced apart louvers.

9. The cleaning system according claim 1, further comprising a fan configured to provide an air flow in an upward direction through the spaced apart louvers, wherein the louver drive is configured to apply the reciprocating louver movement such as to vary a size of the apertures formed by the louvers in synchronism with the reciprocating back and forth sieve movement, and wherein the air flow is modulated in synchronism with the reciprocating louver movement.

10. The cleaning system according to claim 1, further comprising a sensor for providing a yield signal representative of a yield of the sieve assembly and a controller configured controlling the louver drive based on the yield signal.

11. The cleaning system according to claim 10, wherein the sensor comprises a camera or a piezoelectric sensor.

12. The cleaning system according to claim 1, wherein the louver drive comprises one or more electromagnetic relays for actuating the plurality of louvers so as to obtain the louver movement.

13. The cleaning system according to claim 1, wherein the louver drive comprises one or more counterweights mounted to a bottom portion of the louvers to obtain a movement of the louvers that is synchronized with the reciprocating back and forth sieve movement.

14. The cleaning system according to claim 1, wherein the at least one sieve comprises one or more end-stops for delimiting the reciprocating louver movement.

15. A combine harvester comprising a cleaning system according to claim 1.

* * * * *